(12) United States Patent
Bulla et al.

(10) Patent No.: US 9,255,233 B2
(45) Date of Patent: *Feb. 9, 2016

(54) FUEL ADDITIVE COMPOSITIONS

(75) Inventors: Wolfgang Bulla, Herne (DE); Werner Nadolny, Herne (DE); Hubert Jungbluth, Herne (DE); Werner Kalischewski, Herne (DE); Gabriele Lohmann, Herne (DE)

(73) Assignee: Innospec Limited (GB)

(*) Notice: Subject to any disclaimer, the term of this patent is extended or adjusted under 35 U.S.C. 154(b) by 0 days.

This patent is subject to a terminal disclaimer.

(21) Appl. No.: 13/130,896

(22) PCT Filed: Nov. 25, 2009

(86) PCT No.: PCT/GB2009/051600
§ 371 (c)(1),
(2), (4) Date: May 24, 2011

(87) PCT Pub. No.: WO2010/061223
PCT Pub. Date: Jun. 3, 2010

(65) Prior Publication Data
US 2011/0223547 A1    Sep. 15, 2011

(30) Foreign Application Priority Data

Nov. 26, 2008    (GB) ................... 0821503.8

(51) Int. Cl.
| | | |
|---|---|---|
| C10L 1/14 | (2006.01) | |
| C10L 1/16 | (2006.01) | |
| C10L 1/19 | (2006.01) | |
| C10L 10/06 | (2006.01) | |
| G01M 11/02 | (2006.01) | |
| C10L 1/30 | (2006.01) | |

(52) U.S. Cl.
CPC ............. C10L 1/14 (2013.01); C10L 1/1608 (2013.01); C10L 1/191 (2013.01); C10L 10/06 (2013.01); G01M 11/0221 (2013.01); *C10L 1/305* (2013.01)

(58) Field of Classification Search
CPC ......... C10L 1/14; C10L 1/1608; C10L 1/191; C10L 1/305; C10L 10/06; G01M 11/0221
USPC .................. 44/358, 359, 360, 363, 450, 457
See application file for complete search history.

(56) References Cited

U.S. PATENT DOCUMENTS

| | | | |
|---|---|---|---|
| 2,680,756 A | 6/1954 | Pauson | |
| 2,769,828 A | 11/1956 | Sieg | |
| 2,804,468 A | 8/1957 | Arimoto | |
| 2,834,796 A | 5/1958 | Barusch et al. | |
| 2,898,360 A | 8/1959 | Hogan et al. | |
| 2,898,390 A | 8/1959 | Kelly et al. | |
| 3,437,634 A | 4/1969 | Neuse | |
| 4,265,639 A | 5/1981 | Scholtz | |
| 4,370,147 A | 1/1983 | Kenny et al. | |
| 4,389,220 A | 6/1983 | Kracklauer | |
| 5,143,594 A * | 9/1992 | Stephenson et al. | 208/48 AA |
| 7,959,693 B2 * | 6/2011 | Parish et al. | 44/626 |
| 2006/0196109 A1* | 9/2006 | Morton et al. | 44/393 |
| 2008/0263940 A1 | 10/2008 | Parish et al. | |

FOREIGN PATENT DOCUMENTS

| | | |
|---|---|---|
| CN | 1597873 A | 3/2005 |
| DE | 3418648 A1 | 11/1985 |
| DE | 4309065 C2 | 6/1996 |
| DE | 20110995 U1 | 12/2001 |
| DE | 10208326 A1 | 9/2003 |
| DE | 102005032119 A1 | 1/2007 |
| DE | 102007001987 A1 | 7/2008 |
| GB | 733129 A | 7/1955 |
| GB | 763550 A | 12/1956 |
| WO | 8701720 A1 | 3/1987 |
| WO | 9220762 A1 | 11/1992 |
| WO | 0218398 A1 | 3/2002 |
| WO | 03020733 A1 | 3/2003 |
| WO | 2007007191 A1 | 1/2007 |
| WO | WO2007007191 * | 1/2007 |
| WO | 2008084251 A1 | 7/2008 |
| WO | 2009013536 A2 | 1/2009 |

OTHER PUBLICATIONS

International Searching Authority, International Preliminary Report on Patentability and Written Opinion dated May 31, 2011, from Parent PCT/GB2009/051600, filed on Nov. 25, 2009.
International Search Report dated Feb. 23, 2010 for PCT/GB2009/051600 filed Nov. 25, 2009.
"Cleaning gasoline with alcohol ether base," Derwent, Jul. 31, 2004, XP002407738.
"Fuel composition based on engine fuel—contains additives inform of iron salts of fatty acids and camphor group compounds," Derwent, Aug. 31, 1993, XP002407735.
Howe-Grant, M. (Ed.) The Kirk-Othmer Encyclopedia of Chemical Technology, 4th Ed., vol. 8:432-445, John Wiley & Sons, 1993.

* cited by examiner

*Primary Examiner* — Cephia D Toomer

(74) *Attorney, Agent, or Firm* — Burns & Levinson, LLP; Janine M. Susan

(57) ABSTRACT

The invention provides the use of an organic compound selected from a bicyclic monoterpene, substituted bicyclic monoterpene, adamantane, propylene carbonate and mixtures thereof, to improve the solubilization of a solid, fuel-soluble iron compound in a fuel composition or in a precursor liquid to be added to fuel composition.

16 Claims, No Drawings

FUEL ADDITIVE COMPOSITIONS

CROSS-REFERENCE TO RELATED APPLICATIONS

This application is a U.S. national stage application under 35 U.S.C. 371 of co-pending International Application No. PCT/GB09/51600 filed Nov. 25, 2009 and entitled "IMPROVEMENT IN OR RELATING TO FUEL ADDITIVE COMPOSITIONS", which in turn claims priority to Great Britain Patent Application No. 0821503.8 filed Nov. 26, 2008.

The present invention concerns improvements in or relating to fuel additive compositions. In particular, the present invention relates to the use of fuel soluble iron compounds as combustion improvers in a fuel; and to the enhancement of solubilisation of such fuel soluble iron compounds in a fuel; and to the enhancement of solubilisation of such fuel soluble iron compounds in a solvent, prior to addition to a fuel.

Ferrocene and its derivatives are known from the literature. Ferrocene and its manufacture were described for the first time in Nature 168 (1951), Page 1039. Since then, ferrocene and its derivatives as well as corresponding manufacturing procedures have been the object of numerous patents, e.g. U.S. Pat. No. 2,769,828, U.S. Pat. No. 2,834,796, U.S. Pat. No. 2,898,360 and U.S. Pat. No. 3,437,634.

In addition to many other compounds, DE 34 18 648 names ferrocene (dicyclopentadienyl iron) as a possible additive in order to optimise combustion of heating oil. This optimised combustion encourages complete combustion of the heating oil.

In U.S. Pat. No. 4,389,220, a two stage process for conditioning a diesel motor is described. According to this patent, an initial high dosage of ferrocene, 20 to 30 ppm, in the diesel fuel can remove carbon deposits in the combustion chamber and also deposit a layer of catalytic iron oxide on the combustion surfaces. Subsequently, a lower dosage of ferrocene, 10 to 15 ppm, maintains this catalytic iron oxide coating. At the same time it was found that with these measures, fuel consumption is lower by up to 5%. As it is said to be difficult to add organic iron compounds such as ferrocene to fuels in solid form, concentrated solutions are generally used.

WO 2007/007191 describes an additive composition for a fuel comprising:
(i) a metal compound selected from an iron compound, a manganese compound, a calcium compound, a cerium compound and mixtures thereof; and
(ii) an organic compound selected from a bicyclic monoterpene, substituted bicyclic monoterpene, adamantane, propylene carbonate and mixtures thereof;
wherein the additive composition comprises at least 100 ppm of the organic compound (ii).

In the additive composition of WO 2007/007191 the combination of the iron compound and the further component produces a greater reduction in the amount of soot compared to that observed if the same quantity of iron compound is used alone, or to that observed if the same quantity of the further component is used alone. Thus, the quantity of the iron compound used in the mixture may be reduced to a level where, if the iron compound were used on its own, its catalytic effect in respect of soot reduction would be minimal. This task is fulfilled, in WO 2007/007191, by means of a hydrocarbon mixture which produces little soot on combustion with at least 0.1 ppm ferrocene and at least 1 ppm camphor added.

Certain iron compounds such as ferrocene are soluble in fuels and can be supplied and dosed in solid form into fuels. Alternatively they can be supplied in liquid compositions (which we call precursor liquids herein), which may be dosed into fuels. A precursor liquid may be prepared by dosing an iron compound into a suitable solvent, the iron compound being solid, and soluble in the solvent. In either case—that is, whether dosing the solid iron compound into a fuel, or into a solvent to be later mixed with a fuel—the solid iron compound may, for example, be in the form of a powder, crystals, granulate, pills, pellets (including a form of pellet known as a "cushion"). Such solid forms often dissolve well in fuels. A system for dosing a solid additive such as ferrocene is described in DE 4309065C. Nevertheless improved solubilisation is always of interest to the person skilled in the art of fuel additives.

It has now been found, surprisingly, that the solubilisation of certain iron-containing compounds, including ferrocene, is improved by use of certain organic compounds, including camphor; this being an effect distinct from the combustion improvement of WO 2007/007191.

By "solubilisation" herein is meant more rapid dissolution or dispersion of a solid iron compound into a solvent (including a fuel). Alternatively "solubilisation" herein may be considered as the achievement of a greater amount of iron compound dosed in a given volume of a given solvent in a given time under identical conditions (e.g. temperature, stirring or non-stirring). Solubilisation may be measured macroscopically, by assessing the amount of solid iron compound dissolved or dispersed in the solvent. The mechanism of distribution may not be of interest so long as the iron compound is well distributed throughout the solvent. Preferably, however, the iron compound is dissolved in the solvent. For the purpose of these definitions and of other definitions herein the solid iron compound may be provided as the compound per se or may be provided as a solid composition containing an iron compound.

In accordance with a first aspect of the present invention there is provided the use of an organic compound selected from a bicyclic monoterpene, substituted bicyclic monoterpene, adamantane, propylene carbonate and mixtures thereof, to improve the solubilisation of a solid, fuel-soluble iron compound in a fuel composition or in a precursor liquid to be added to a fuel composition.

In a second aspect the present invention provides a method for combustion of a fuel composition in a combustion system with an exhaust, wherein the fuel composition comprises a fuel additised by a solid, fuel-soluble iron compound and an organic compound selected from a bicyclic monoterpene, substituted bicyclic monoterpene, adamantane, propylene carbonate and mixtures thereof; wherein the iron compound and the organic compound are added to the fuel in sufficient amounts that combustion of the fuel is improved by the iron compound and the organic compound, and such that solubilisation of the iron compound in the fuel, or in a precursor liquid which is itself added to the fuel, is improved by the organic compound.

Preferably, in the first aspect and in the second aspect, the iron compound and the organic compound are added simultaneously to the fuel or to a solvent which will form, with the iron compound and the organic compound, the precursor liquid. Preferably they are added simultaneously, preferably together in the form of a solid additive composition, to the fuel or to the solvent. However the separate addition of the iron compound and the organic compound is not excluded. For example the organic compound may have been added to the fuel or the solvent before the iron compound.

In one aspect, the task of the invention is to provide a hydrocarbon mixture which contains an iron compound in combination with a further, organic, compound; wherein the organic compound is used to improve the solubilisation of the iron compound; and wherein the iron compound and the organic compound are used to improve the combustion of the hydrocarbon mixture.

Iron Compound

It is important that the iron compound for use in the invention is a solid under use conditions, and is fuel soluble or dispersible, and preferably fuel stable. Any of the compounds named or defined below which meet such criteria may be used in the present invention.

- an iron complex selected from bis-cyclopentadienyl iron; substituted bis-cyclopentadienyl iron; overbased iron soaps, such as iron tallate and iron octoate; and mixtures thereof.
- an iron complex selected from bis-cyclopentadienyl iron, substituted bis-cyclopentadienyl iron and mixtures thereof.
- a substituted bis-cyclopentadienyl iron selected from adamantyl bis-cyclopentadienyl iron, bis(dicyclopentadienyl-iron) dicarbonyl and mixtures thereof. Bis(dicyclopentadienyl-iron) dicarbonyl is also known as cyclopentadienyl iron dicarbonyl dimer.
- an iron complex selected from bis-cyclopentadienyl iron, adamantyl bis-cyclopentadienyl iron, bis(dicyclopentadienyl-iron)dicarbonyl, iron tallate and iron octoate; and mixtures thereof.
- substituted bis-cyclopentadienyl iron complexes wherein the substituents can be, for example, one or more $C_{1-30}$ alkyl groups, preferably $C_{1-20}$ alkyl groups, preferably $C_{1-10}$ alkyl groups, $C_{1-5}$ alkyl groups, preferably $C_{1-2}$ alkyl groups. A combination of such iron complexes may also be used.
- alkyl-substituted bis-cyclopentadienyl iron complexes, such as cyclopentadienyl-(methylcyclopentadienyl) iron, cyclopentadienyl(ethyl-cyclopentadienyl) iron, bis-(methylcyclopentadienyl) iron, bis-(ethylcyclopentadienyl) iron, bis-(1,2-dimethyl-cyclopentadienyl) iron, and bis-(1-methyl-3-ethylcyclo-pentadienyl) iron. These iron complexes can be prepared by the processes taught in U.S. Pat. No. 2,680,756, U.S. Pat. No. 2,804,468, GB-A-0733129 and GB-A-0763550. Another volatile iron complex is iron pentacarbonyl.
- iron complexes, namely bis-cyclopentadienyl iron and/or bis-(methylcyclo-pentadienyl) iron.
- substituted bis-cyclopentadienyl complex of iron (substituted ferrocenes) including those in which substitution may be on either or both of the cyclopentadienyl groups. Suitable substituents include, for example, one or more $C_{1-5}$ alkyl groups, preferably $C_{1-2}$ alkyl groups.
- alkyl-substituted bis-cyclopentadienyl iron complexes (substituted ferrocenes) include cyclopentadienyl(methylcyclopentadienyl) iron, bis-(methylcyclopentadienyl) iron, bis-(ethylcyclopentadienyl) iron, bis-(1,2-dimethylcyclopentadienyl) iron and 2,2-diethylferrocenyl-propane.
- Other suitable substituents that may be present on the cyclopentadienyl rings include cycloalkyl groups such as cyclopentyl, aryl groups such as tolylphenyl, and acetyl groups, such as present in diacetyl ferrocene.
- ferrocenes linked by a "bridge" may be used in the present invention. Suitable compounds are taught in WO 02/018398 and WO 03/020733. Thus, a suitable "bridge" linking ferrocenes may be a unsubstituted or substituted hydrocarbyl group. The term "unsubstituted or substituted hydrocarbyl group" as used herein means a group comprising at least C and H and which may, optionally, comprise one or more suitable substituents. In a preferred embodiment one carbon atom of the "bridge" hydrocarbyl group is attached to two ferrocene moieties, hence, bridging the ferrocenes. Further ferrocene moieties may be attached via further "bridge" hydrocarbyl groups. A typical unsubstituted or substituted hydrocarbyl group is an unsubstituted or substituted hydrocarbon group. Here the term "hydrocarbon" means any one of an alkylene group, an alkenylene group, an alkynylene group, which groups may be linear, branched or cyclic, or an aryl group. For example, the unsubstituted or substituted hydrocarbon group may be an alkylene, branched alkylene or cycloalkylene group. The term hydrocarbon also includes those groups but wherein they have been optionally substituted. If the hydrocarbon is a branched structure having substituent(s) thereon, then the substitution may be on either the hydrocarbon backbone or on the branch; alternatively the substitutions may be on the hydrocarbon backbone and on the branch. A preferred unsubstituted or substituted hydrocarbon group is an unsubstituted or substituted alkylene group having at least one carbon atom in the alkylene linkage. More preferably, the unsubstituted or substituted hydrocarbon group is an unsubstituted or substituted alkylene group having from 1 to 10 carbon atoms in the alkylene linkage, for example, having at least 2 carbon atoms in the alkylene linkage or having one carbon atom in the alkylene linkage. If the hydrocarbyl group comprises more than one C then those carbons need not necessarily be linked to each other. For example, at least two of the carbons may be linked via a suitable element or group. Thus, the hydrocarbyl group may contain hetero atoms. Suitable hetero atoms will be apparent to those skilled in the art and include, for instance, sulphur, nitrogen and oxygen, for example, oxygen.

- other organometallic complexes of iron, to the extent (as with other iron compounds) that these are solid and fuel soluble or dispersible, and preferably stable. Such complexes include, for example, iron pentacarbonyl, di-iron nonacarbonyl, (1,3-butadiene)-iron tricarbonyl, and (cyclopentadienyl)-iron dicarbonyl dimer. Salts such as ditetralin iron tetraphenylborate $(Fe(C_{10}H_{12})_2(B(C_6H_5)_4)_2)$ may also be employed.

A preferred iron complex is ferrocene (i.e. bis-cyclopentadienyl iron).

Instead of ferrocene, equivalent quantities of other organic iron compounds which are soluble in hydrocarbon mixtures can be used in respect of the iron content. This applies to all statements and descriptions which follow. Dicyclopentadienyl iron has proven to be particularly suitable. Ferrocene derivatives can be used at least in part instead of ferrocene. Ferrocene derivatives are compounds where, starting from a basic ferrocene molecule, further substituents are found on one or both of the cyclopentadienyl rings. Examples could be ethylferrocene, butylferrocene, acetylferrocene and 2,2-bisethylferrocenylpropane. Geminal bisferrocenylalkanes are also suitable, as described, for example, in DE 201 10 995 and DE 102 08 326.

As a result of a combination of their solubility, stability, high iron content and volatility, the substituted ferrocenes are preferred iron compounds for use in the invention. Ferrocene itself is an especially preferred iron compound on this basis. Ferrocene of suitable purity is sold in a range of useful forms, including in a solid form, for example PLUTOcen® and OCTAMAR® from Innospec Deutschland GmbH.

The iron compounds for use in the invention need not feature iron-carbon bonds in order to be solid, soluble or dispersible, and preferably fuel compatible and stable. Salts may be used; these may be neutral or overbased. Thus, for example, overbased soaps including iron stearate, iron oleate, iron tallate, and iron naphthenate may be used. Methods for the preparation of metal soaps are described in The Kirk-Othmer Encyclopaedia of Chemical Technology, 4th Ed, Vol. 8:432-445, John Wiley & Sons, 1993. Suitable stoichiometric, or neutral, iron carboxylates for use in the invention include the so-called 'drier-iron' species, such as iron tris(2-ethylhexanoate) [19583-54-1].

Iron complexes not featuring iron-carbon bonds and not prepared as in the preceding reference may also be used in the invention provided these are adequately solid, fuel soluble or dispersible, and preferably stable. Examples include complexes with β-diketonates, such as tetramethylheptanedionate.

Iron complexes of the following chelating ligands solid and fuel soluble or dispersible are also suitable for use in the invention:

- aromatic Mannich bases such as those prepared by reaction of an amine with an aldehyde or ketone followed by nucleophilic attack on an active hydrogen containing compound, e.g. the product of the reaction of two equivalents of (tetrapropenyl)phenol, two of formaldehyde and one of ethylenediamine;
- hydroxyaromatic oximes, such as (polyisobutenyl)-salicylaldoxime. These may be prepared by reaction of (polyisobutenyl)phenol, formaldehyde and hydroxylamine;
- Schiff bases such as those prepared by condensation reactions between aldehydes or ketones (e.g. (tert-butyl)-salicylaldehyde) and amines (e.g. dodecylamine). A tetradentate ligand may be prepared using ethylenediamine (half equivalent) in place of dodecylamine;
- substituted phenols, such as 2-substituted-8-quinolinols, for example 2-dodecenyl-8-quinolinol or 2-N-dodecenylamino-methylphenol;
- substituted phenols, such as those wherein the substituent is $NR_2$ or SR in which R is a long chain (e.g. 20-30 C atoms) hydrocarbyl group. In the case of both α- and β-substituted phenols, the aromatic rings may beneficially be further substituted with hydrocarbyl groups, e.g. lower alkyl groups;
- carboxylic acid esters, in particular succinic acid esters such as those prepared by reaction of an anhydride (e.g. dodecenyl succinic anhydride) with a single equivalent of an alcohol (e.g. triethylene glycol);
- acylated amines. These may be prepared by a variety of methods well known to those skilled in the art. However, particularly useful chelates are those prepared by reaction of alkenyl substituted succinates, such as dodecenyl succinic anhydride, with an amine, such as N,N'-dimethyl ethylene diamine or methyl-2-methylamino-benzoate;
- amino-acids, for example those prepared by reaction of an amine, such as dodecylamine, with an α,β-unsaturated ester, such as methylmethacrylate. In cases where a primary amine is used, this may be subsequently acylated, such as with oleic acid or oleyl chloride;
- hydroxamic acids, such as that prepared from the reaction of hydroxylamine with oleic acid,
- linked phenols, such as those prepared from condensation of alkylated phenols with formaldehyde. Where a 2:1 phenol:formaldehyde ratio is used the linking group is $CH_2$. Where a 1:1 ratio is employed, the linking group is $CH_2OCH_2$;
- alkylated, substituted pyridines, such as 2-carboxy-4-dodecylpyridine;
- borated acylated amines. These may be prepared by reaction of a succinic acylating agent, such as poly(isobutylene)succinic acid, with an amine, such as tetraethylenepentamine. This procedure is then followed by boronation with a boron oxide, boron halide or boronic acid, amide or ester. Similar reactions with phosphorus acids result in the formation of phosphorus-containing acylated amines, also suitable for providing an oil-soluble iron chelate for use in the invention;
- pyrrole derivatives in which an alkylated pyrrole is substituted at the 2-position by OH, $NH_2$, NHR, $CO_2H$, SH or C(O)H. Particularly suitable pyrrole derivatives include 2-carboxy-t-butylpyrroles;
- sulphonic acids, such as those of the formula $R^1SO_3H$, where $R^1$ is a $C_{10}$ to about $C_{60}$ hydrocarbyl group, e.g. dodecylbenzene sulphonic acid;
- organometallic complexes of iron, such as ferrocene, substituted ferrocenes, iron naphthenate, iron succinates, stoichiometric or over-based iron soaps (carboxylate or sulphonate), iron picrate, iron carboxylate and iron-diketonate complexes.

Suitable iron picrates for use in the invention may include those described in U.S. Pat. No. 4,370,147 and U.S. Pat. No. 4,265,639.

Other iron-containing compounds for use in the invention may include those of the formula M(R)x.nL wherein: M is an iron cation; R is the residue of an organic compound RH in which R is an organic group containing an active hydrogen atom H replaceable by the iron M and attached to an O, S, P, N or C atom in the group R; x is 2 or 3; n is 0 or a positive integer indicating the number of donor ligand molecules forming a dative bond with the iron cation; and L is a species capable of acting as a Lewis base.

The co-ordination chemistry relevant to the solubilisation of transition metals, including iron, in hydrocarbon solvents, e.g. diesel fuel, is well known to those skilled in the art (see e.g. WO-A-87/01720 and WO-A-92/20762).

Organic Compound

As noted above the organic compound is selected from a bicyclic monoterpene, substituted bicyclic monoterpene, adamantane, propylene carbonate and mixtures thereof.

Preferably, the organic compound is selected from a bicyclic monoterpene, substituted bicyclic monoterpene and mixtures thereof.

Suitable substituted bicyclic monoterpenes are those wherein the substituents can be, for example, one or more of aldehyde, ketone, alcohol, acetate and ether functional groups.

Preferably, the organic compound is a bicyclic monoterpene or substituted bicyclic monoterpene selected from camphor, camphene, isobornyl acetate, dipropyleneglycol-isobornyl ether, phenzene; analog aldehydes or monoterpenic ketones, for example phenzione. 1,7,7-trimethylbicyclo[2.2.1]heptan-2-one; and mixtures thereof.

In one aspect, the organic compound is selected from camphor, camphene, isobornyl acetate, dipropyleneglycol-isobornyl ether, adamantane, propylene carbonate and mixtures thereof.

Preferably, the organic compound is camphor. Camphor has the systematic name 1,7,7-trimethylbicyclo[2.2.1]heptan-2-one. Camphor has the following structure:

Camphor has optical isomers which are believed to be active individually. The present invention covers the use of any isomers of any organic compound (including camphor), alone or as any mixture of isomers, including a racemic mixture.

In a preferred aspect, therefore, the iron compound is bis-cyclopentadienyl iron and the organic compound is the compound camphor.

Iron Compound and Organic Compound Together

In relation to definitions of amounts and ratios of compounds given in this specification, unless otherwise stated all definitions are weight/weight definitions. Amounts stated denote the total amount of iron compounds, or the total amount of organic compounds, when more than one iron compound, or more than one organic compound, is present.

The ratio of iron compound to organic compound may suitably be from 99:1 to 1:99, preferably from 80:1 to 1:80, preferably from 60:1 to 1:60, preferably from 40:1 to 1:40, preferably from 20:1 to 1:20, preferably from 12:1 to 1:12.

The ratio of iron compound to organic compound may suitably be from 99:1 to 1:10, preferably from 19:1 to 1:7, preferably from 9:1 to 1:6.

In certain preferred embodiments the ratio of iron compound to organic compound is from 19:1 to 1:1, preferably from 9:1 to 1:1.

These ratios apply whether the iron compound and the organic compound are added to the fuel or solvent, as the case may be, as separate compounds or together, in an additive composition.

As one particular example, an iron compound, for example bis-cyclopentadienyl iron, may be dosed into diesel fuel, the dissolution or dispersion being aided by an organic compound, for example camphor, to make a precursor liquid. The precursor liquid may be blended into a fuel, for example into marine fuel or HFO (Heavy Fuel Oil). The ratio of iron compound to organic compound is suitably as stated above, and is preferably from 9:1 to 1:6, most preferably from 9:1 to 1:1.

Additive Composition

As noted above an additive composition containing both an iron compound and an organic compound is a preferred, but not an essential, means for dosing the said compounds into the fuel, or the solvent, to form the precursor liquid, as the case may be.

An additive composition when used in the present invention may be added directly, as a solid, to the fuel to be combusted. Alternatively it may be dissolved in a solvent to form a precursor liquid, which is then added to the fuel. It is preferable for such solutions to exhibit a high concentration of the active components in the solvent. Ideal solvents are those in which all the active ingredients dissolve equally well and which form a solution which is stable, in use. In some circumstances a solution is provided which is stable over prolonged storage periods and/or under cold conditions.

The solvent may be any solvent in which the iron compound and the organic compound is soluble and suitable to be later dosed into a fuel. A preferred solvent is selected from an aromatic compound, a paraffin compound and mixtures thereof. As used herein, the term "paraffin compound" includes both straight chain and branched chain compounds. The branched chain compounds are also known as iso-paraffins. Furthermore any material defined later as a fuel is potentially suitable as a solvent. For practical reasons lighter, free flowing fuels are favoured for this purpose.

Fuel additive compositions used in the invention may be added as part of a package to the fuel prior to combustion. This may be done at any stage in the fuel supply chain (for example, at the refinery or distribution terminal) or may be added via a dosing device associated with the combustion system, for examples, on-board the vehicle. If a dosing device is used it may dose the additives either to the fuel or even separately direct into the combustion chamber or inlet system. The fuel additive compositions may be added to the fuel in the combustion systems' fuel tank by the user, a so-called 'aftermarket' treatment.

Preferably an additive composition used in the present invention is in the form of pellets (including pellets called "pills" and "cushions" in the art). Preferably the pellets are of a granular, preferably crystalline, material, a pressed, but not heavily compacted, with a loose open microstructure to allow easy ingress of fuel or solvent. Preferably they are of mean weight in the range 0.1 to 20 g, preferably 0.2 to 10 g, preferably 0.4 to 5 g.

Preferably the pellets are dispensed into the fuel, when required, in batches using a suitable additive dosing system. One type of suitable additive dosing system is described in DE 4309065C.

Preferably at least 20% of the weight of the pellets is provided by the iron compound and the organic compound, in combination; preferably at least 50%, preferably at least 70%, preferably at least 90%, and preferably at least 98%. Most preferably all of the weight of the pellets is provided by the iron compound and the organic compound, in combination;

An additive composition or precursor liquid used in the present invention might be dosed at any stage in the fuel supply chain prior to combustion of the fuel. The fuel additive compositions of the invention may be dosed to the fuel at any stage in the fuel supply chain. Preferably, the additive composition is added to the fuel close to the engine or combustion system, within the fuel storage system for the engine or combustion system at the refinery, distribution terminal or at any other stage in the fuel supply chain, including aftermarket use. However, the additive composition may be added to the fuel at the refinery or at the distribution terminal.

Fuel

The fuel may suitably be a mineral or bio derived fuel, or a blend thereof.

Suitable fuels for use in the present invention include heavy fuel oil, gasoline, diesel, marine fuel, bunker fuel and heating oil, for example, light heating oil, and kerosene; and in general, middle distillate oil and heavy fuel oil derived from refining petroleum or as a product of, bio-fuels, such as vegetable oils, hydrogenated vegetable oils, used cooking oils, and derivatives thereof; and various fuels derived from modern processes such as Fischer-Tropsch processes GTL (gas-to-liquid), CTL (coal-to-liquid), BTL (biomass-to-liquid) and OTL (oil sands-to-liquid), or blends thereof of these fuels.

Petroleum distillate fuel oils can comprise atmospheric or vacuum distillates. The distillate fuel can comprise cracked gas oil or a blend of any proportion of straight run or thermally or catalytically cracked distillates. The distillate fuel in many cases can be subjected to further processing such hydrogen-treatment or other processes to improve fuel properties.

Middle distillates can be utilized as a fuel for locomotion in motor vehicles, ships and boats as burner fuel in home heating and power generation and as fuel in multi purpose stationary diesel engines.

Heavy oils are residues or "residual fuels" commonly derived from refinery processing operations such as distillation (atmospheric pressure or reduced pressure), cracking (thermal or catalytic) of petroleum or crude oils. These residual furnace fuels or residual engine fuels (bunker C oils) essentially comprise paraffinic, naphthenic and aromatic hydrocarbons, some containing high molecular weight components.

Heavy oils, in particular in the form of heavy fuel oils (marine fuel oils) and of mixtures of heavy fuel oils and heavy distillates (inter fuel oils) are used in large amounts, primarily as furnace fuel in industrial plants and power stations and as engine fuel for relatively slow-burning internal combustion engines, in particular marine engines.

Engine fuel oils and burner fuel oils generally have flash points greater than 38° C. Middle distillate fuels are higher boiling mixtures of aliphatic, olefinic, and aromatic hydrocarbons and other polar and non-polar compounds having a boiling point up to about 350° C. Middle distillate fuels generally include, but are not limited to, various diesel fuels. Diesel fuels encompass Grades No. 1-Diesel, 2-Diesel, 4-Diesel Grades (light and heavy), Grade 5 (light and heavy), and Grade 6 residual fuels. Middle distillates specifications are described in ASTM D-975, for automotive applications (the entire teaching of which is incorporated herein by reference), and ASTM D-396, for burner applications (the entire teaching of which is incorporated herein by reference). The diesel may be regular diesel, biodiesel, low sulphur diesel and ultra-low sulphur diesel.

The fuel may in some embodiments be gasoline.

The fuel may be a fuel for spark ignition engines.

Preferably the fuel is a fuel for a high compression spontaneous ignition engine.

It may be a light heating oil. Preferably, the light heating oil is HEL: Heizöl extra leichtflüssig according to DIN 51603, Part 1.

A bio fuel may suitably be bio diesel. Bio diesel as defined by ASTM specification D-6751 (the entire teachings of which are incorporated herein by reference) and EN 14214 are fatty acid mono alkyl esters of vegetable or animal oils. Suitable bio fuel may be made from any fat or oil source, including tallow, but is preferably derived from a vegetable oil, for example rapeseed oil, palm oil, palm kernel oil, coconut oil, corn or maize oil, sunflower oil, safflower oil, canola oil, peanut oil, cottonseed oil, jatropha oil (physic nut), used cooking oil or soybean oil. Preferably it is a fatty acid alkyl ester (FAAE). More specifically the bio fuel may comprise rapeseed methyl ester (RME) and/or soybean methyl ester (SME) and/or palm oil methyl ester (PME) and/or jatropha oil, methyl ester.

Fuel Composition

The fuel composition herein is the fuel additised with the iron compound and the organic compound whether added directly as solid or added by means of a precursor liquid.

Preferably the fuel composition comprises at least 0.1 ppm of the iron compound, preferably at least 1 ppm, preferably at least 5 ppm, preferably at least 10 ppm, and most preferably at least 20 ppm.

Preferably the fuel composition comprises up to 1000 ppm of the iron compound, preferably up to 200 ppm, preferably up to 100 ppm, preferably up to 60 ppm, preferably up to 40 ppm, and most preferably up to 30 ppm.

Preferred amounts of the organic compound could be calculated by applying the preferred ratios of iron compound to organic compound to the concentrations given above for the iron compound in the fuel. However for practical guidance the following preferred concentrations may be stated.

Preferably the fuel composition comprises at least 0.02 ppm of the organic compound, preferably at least 0.1 ppm, preferably at least 0.5 ppm, preferably at least 1 ppm, and most preferably at least 2 ppm.

Preferably the fuel composition comprises up to 1000 ppm of the organic compound, preferably up to 100 ppm, preferably up to 70 ppm, preferably up to 50 ppm, preferably up to 40 ppm, preferably up to 30 ppm, preferably up to 10 ppm, preferably up to 5 ppm, and most preferably up to 3 ppm.

In a preferred embodiment the fuel composition comprises from 5 to 50 ppm of an iron compound and an organic compound in an weight of from 5 to 30% wt/wt, based on the weight the iron compound.

In an especially preferred embodiment the fuel composition comprises from 20 to 30 ppm of an iron compound and an organic compound in an amount of from 6 to 15% of the iron compound.

Definitions can also be stated in terms of the amount of iron present (as element).

If, for example, the iron compound is ferrocene, then 0.1 ppm of ferrocene is an amount sufficient to provide 0.03 ppm of the iron (as element). Thus, if the fuel composition comprises an iron compound in an amount sufficient to provide 0.03 ppm of the iron (as element), it would be present in an equivalent amount to 0.1 ppm of ferrrocene.

Preferably the fuel composition comprises at least 0.03 ppm of the iron (as element), preferably at least 0.3 ppm, preferably at least 1.5 ppm, preferably at least 3 ppm, and most preferably at least 6 ppm.

Preferably the fuel composition comprises up to 300 ppm of the iron (as element), preferably up to 60 ppm, preferably up to 30 ppm, preferably up to 18 ppm, preferably up to 12 ppm, and most preferably up to 9 ppm.

The fuel composition may be provided by diluting a said precursor liquid in the fuel. Preferably, the ratio of the precursor liquid to fuel is from 1:100 to 1:10,000; preferably from 1:500 to 1:8,000; preferably from 1:600 to 1:5,000; preferably from 1:700 to 1:3000; preferably from 1:800 to 1:2000.

As noted above, in a preferred embodiment, the iron compound is bis-cyclopentadienyl iron and the organic compound is camphor.

The soot-reducing effects can be seen particularly clearly in heating oils, especially in so-called HEL: Heizöl extra leichtflüssig according to DIN 51603, Part 1 heating oils.

Heating oils serve, as the name suggests, to provide heat. For this purpose they are burnt using special burners and with the addition of air. The present invention suitably produces less visible smoke, and less measurable soot.

With the help of the additive composition, fuels to which no additive has been added can be transformed into fuel compositions of benefit to the invention, by adding a corresponding quantity of the additive composition to the fuel and allowing it to dissolve; the organic compound suitably aiding the solubilisation of the iron compound. It is simple and customer-friendly to offer an additive composition which already contains the organic compound in an effective proportion to the iron compound, and we have now found an important and previously unrecognised benefit: improvement in the solubilisation of the iron compound.

Composition

In accordance with a third aspect of the present invention there is provided a fuel composition containing 5-50 ppm (preferably 10-40 ppm, preferably 20-30 ppm) of an iron compound and 0.5-10 ppm (preferably 1-5 ppm) of an organic compound selected from a bicyclic monoterpene, substituted bicyclic monoterpene, adamantane, propylene carbonate and mixtures thereof.

In accordance with a fourth aspect of the present invention there is provided a fuel composition containing 5-50 ppm (preferably 10-40 ppm, preferably 20-30 ppm) of an iron compound and an organic compound selected from a bicyclic monoterpene, substituted bicyclic monoterpene, adamantane, propylene carbonate and mixtures thereof, in an amount of 5-30% by wt/wt of iron compound.

In accordance with a fifth aspect of the present invention there is provided a fuel composition containing 5-50 ppm (preferably 10-40 ppm, preferably 20-30 ppm) of an iron compound and an organic compound selected from a bicyclic monoterpene, substituted bicyclic monoterpene, adamantane, propylene carbonate and mixtures thereof, in an amount of 5-30% by wt, on wt of iron compound, and in an absolute amount of from 0.5-10 ppm (preferably 1-5 ppm).

In accordance with a sixth aspect of the present invention there is provided an additive concentrate composition containing an iron compound and an organic compound each in an amount so as to provide the concentrations stated in the preceding paragraphs when diluted into fuel (whether directly or via a precursor liquid).

Application Areas and Effects

The present invention, involving the improved solubilisation of the iron compound, may be used with any of the fuels mentioned above.

The invention may be used in combustion systems having particulate filters to assist the regeneration of the particulate filters. The particulate filters may for example be diesel particulate filters (or DPFs) used in diesel combustions systems.

One benefit that may be achieved by the present invention is the improvement in the regeneration temperature and/or required regeneration frequency of a particulate filter located in an exhaust system of a combustion system.

One benefit that may be achieved by the present invention is the reduction of soot content and ash content of an exhaust of a combustion system.

One benefit that may be achieved by the present invention is the improvement of combustion efficiency of a combustion system.

One benefit that may be achieved by the present invention is an improvement in the fuel economy of a combustion system.

One benefit that may be achieved is the enhanced fluidity of the additized fuel, leading to advantages in storage, delivery and burning.

An especially significant advantage and feature of the present invention is the improved dissolution of the iron compound in the fuel, or in a precursor liquid to be added to the fuel.

Further Additives

The additive composition and/or the fuel composition may further comprise further additives, such as performance-enhancing additives. A non-limiting list of such further additives includes corrosion inhibitors, rust inhibitors, gum inhibitors, anti-oxidants, solvent oils, anti-static agents, dyes, anti-icing agents, ashless dispersants and detergents.

Combustion System

Preferably the combustion system is selected from a burner, engine and furnace.

Preferably the combustion system is selected from a burner and a furnace.

Preferably the combustion system is an engine, including a compression ignition engine (for example diesel engine) or a spark ignition engine.

Soot Content

The Bacharach soot number is a qualitative measure for evaluating the completeness of combustion, based on the optical absorption of visible light by particles that have been deposited on a filter. The Bacharach soot number is part of the required testing procedure for judging the combustion quality of oil burners in countries such as Switzerland.

A well defined amount of undiluted flue gas is sucked through a white filter, leaving behind a discoloured spot. The colour of the spot is compared with a calibrated gray scale reaching from 0 (white) to 9 (black). This number is assessed electronically by measuring the reflectance of visible light shone on the loaded filter. The discolouring of the sample filter is attributed to the presence of black shoot.

Preferably, in the present invention, the fuel composition provides a 0.5 reduction in the Bacharach soot number compared with the Bacharach soot number observed with the fuel alone. Preferably, the fuel composition provides a 0.8 reduction in the Bacharach soot number; preferably a 1.0 reduction in the Bacharach soot number; preferably a 1.2 reduction in the Bacharach soot number: preferably a 1.5 reduction in the Bacharach soot number; preferably a 1.8 reduction in the Bacharach soot number; preferably a 2.0 reduction in the Bacharach soot number compared with the Bacharach soot number observed with the fuel alone.

Preferably, the fuel composition provides a Bacharach soot number of less than 1.0; preferably, less than 0.9; preferably, less than 0.8; preferably, less than 0.7; preferably, less than 0.6; preferably, less than 0.5.

The soot content may be measured by ASTM test method D-2156.

Ash Content

Preferably, in the present invention the fuel composition provides an ash content of 0.010 wt % or less. Preferably, the fuel composition provides an ash content of 0.009 wt % or less; 0.008 wt % or less; 0.007 wt % or less; 0.006 wt % or less; 0.005 wt % or less; 0.004 wt % or less; 0.003 wt % or less; 0.002 wt % or less; 0.001 wt % or less.

Ash content may be measured according to the standard method DIN EN 6245.

The present invention will now be described in further detail in the following examples.

SOLUBILITY EXAMPLES

1. Solubility in Diesel Fuel

In this example, additive compositions comprising ferrocene and camphor were granulated and then added to a diesel fuel meeting the requirements of EN 590 (specification given below). 6 g of additive composition was added to 194 g fuel in a 400 ml beaker at ambient temperature (3% w/w). The mixture was stirred using a paddle agitator 120×19×1 mm in size, positioned 10 mm above the bottom of the beaker rotated at 500 min$^{-1}$.

After 1 hour, the weight of undissolved ferrocene was determined and the results tabulated below were recorded.

| Additive composition % weight | | % undissolved ferrocene after |
|---|---|---|
| Ferrocene | Camphor | 1 hour |
| 100 | 0 | 17 |
| 90 | 10 | less than 0.1 |

EN 590:2004 Diesel Fuel Specification

| Property | Unit | minimum | maximum |
|---|---|---|---|
| Cetane number | | 51.0 | — |
| Cetane index | | 46.0 | — |
| Density at 15° C. | kg/m$^3$ | 820 | 845 |
| Polycyclic aromatic hydrocarbons | % (m/m) | — | 11 |
| Sulfur | mg/kg | — | 350 (until 2004 Dec. 31) or 50.0 10.0 |
| Flash point | ° C. | Above 55 | — |
| Carbon residue (on 10% distillation residue) | % (m/m) | — | 0.30 |
| Ash content | %(m/m) | — | 0.01 |
| Water content | mg/kg | — | 200 |
| Total contamination | mg/kg | — | 24 |
| Oxidation stability | g/m$^3$ | — | 25 |
| Lubricity, corrected wear scar diameter (wsd 1.4) at 60° C. | μm | — | 460 |
| Viscosity at 40° C. | mm$^2$/s | 2.00 | 4.50 |
| Distillation | | | |
| % (V/V) recovered at 250° C. | % (V/V) | — | <65 |
| % (V/V) recovered at 350° C. | % (V/V) | 85 | |
| 95% (V/V) recovered at | ° C. | | 360 |
| Fatty acid methyl ester (FAME) content | % (VV) | — | 5 |

2. Solubility in Caromax 20

In this example, additive compositions comprising ferrocene and camphor were pressed into pellets known as cushions. The cushions were of three different sizes, small, medium and large.

10 g of additive composition was added to 190 g Caromax 20 in a 400 ml beaker at ambient temperature. (5% w/w) The mixture was stirred using a paddle agitator 120×19×1 mm in size, positioned 10 mm above the bottom of the beaker rotated at 500 min$^{-1}$.

CAROMAX 20 is a hydrocarbon product available from Petrochem Carless of Leatherhead, U.K and has the following characteristics:

| Density at 15° C. | 0.891 |
|---|---|
| Distillation range IBP ° C. | 188 |
| 50% | 190 |
| Dry point ° C. | 209 |
| Flash point ° C. | 66 |
| Aromatic content % by wt | >99 |
| Naphthalene content % by wt | 8 |

The time taken to dissolve completely (visual assessment) was recorded in each case, and is tabulated below.

| Cushion Size | Weight of additive composition per cushion (g) | Additive composition % weight | | Time taken to dissolve (mins) |
|---|---|---|---|---|
| | | Ferrocene | Camphor | |
| Small | 0.710 | 100 | 0 | 63 |
| Small | 0.606 | 85 | 15 | 26 |
| Small | 0.571 | 75 | 25 | 20 |
| Small | 0.461 | 57.5 | 42.5 | 11 |
| Medium | 1.134 | 85 | 15 | 37 |
| Medium | 1.083 | 75 | 25 | 19 |
| Medium | 0.944 | 57.5 | 42.5 | 8 |
| Large | 4.437 | 85 | 15 | 52 |
| Large | 4.079 | 75 | 25 | 36 |
| Large | 3.855 | 57.5 | 42.5 | 18 |

The results are shown show the ferrocene alone (in PLUTOcen) dissolves in the fuel but that dissolution time is reduced by addition of the organic compound, camphor.

The invention claimed is:

1. A method of improving the solubilisation of a solid, fuel-soluble iron compound in a fuel composition, the method comprising adding to the composition an organic compound selected from the group consisting of a bicyclic monoterpene, substituted bicyclic monoterpene, propylene carbonate and mixtures thereof; wherein the iron compound and the organic compound are added to the fuel in sufficient amounts that combustion of the fuel is improved by the iron compound and the organic compound; and wherein the ratio of iron compound to organic compound is from 19:1 to 1:1 and the organic compound is present in an amount of 0.5-10 ppm; wherein the iron compound and the organic compound are added together as a solid additive composition to the fuel or to a solvent which will form, with the iron compound and the organic compound, a precursor liquid.

2. The method of claim 1, wherein the iron compound is comprised of granules or pellets.

3. The method of claim 1, wherein the iron compound is an iron complex selected from the group consisting of bis-cyclopentadienyl iron, substituted bis-cyclopentadienyl iron, iron tallate and mixtures thereof.

4. The method of claim 3, wherein the iron compound is bis-cyclopentadienyl iron or a substituted bis-cyclopentadienyl iron.

5. The method of claim 1, wherein the iron compound is bis-cyclopentadienyl iron.

6. The method of claim 1, wherein the organic compound is a bicyclic monoterpene or substituted bicyclic monoterpene.

7. The method of claim 1, wherein the organic compound is camphor.

8. A fuel composition containing a) 5-50 ppm iron compound and b) an organic compound selected from the group consisting of a bicyclic monoterpene, substituted bicyclic monoterpene, propylene carbonate and mixtures thereof, the organic compound being present in an amount of 0.5-10 ppm and wherein the ratio of iron compound to organic compound is from 19:1 to 1:1.

9. A solid additive concentrate composition containing an iron compound and an organic compound selected from the group consisting of a bicyclic monoterpene, substituted bicyclic monoterpene, propylene carbonate and mixtures thereof, each in an amount so as to provide an effective concentration thereof when diluted into fuel directly or via a precursor liquid, wherein the ratio of iron compound to organic compound is from 19:1 to 1:1 and the organic compound is present in an amount of 0.5-10 ppm.

10. The method of claim 1, wherein the fuel composition comprises at least 5 ppm of the iron compound.

11. The method of claim 1, wherein the fuel composition comprises at least 20 ppm of the iron compound.

12. The method of claim 1, wherein the fuel composition comprises up to 100 ppm of the iron compound.

13. The method of claim 1, wherein the fuel composition comprises up to 30 ppm of the iron compound.

14. The method of claim 1, wherein the fuel composition comprises at least 2 ppm of the organic compound.

15. The method of claim 4, wherein the substituted bis-cyclopentadienyl iron is selected from the group consisting of adamantyl bis-cyclopentadienyl iron, bis(dicyclopentadienyl iron)dicarbonyl and mixtures thereof.

16. The method of claim 6, wherein the substituted bicyclic monoterpene is selected from the group consisting of camphor, camphene, isobornyl acetate, dipropyleneglycol isobornyl ether and mixtures thereof.

* * * * *